United States Patent
Ayachitula et al.

(10) Patent No.: US 7,543,058 B1
(45) Date of Patent: Jun. 2, 2009

(54) DEFINING AND IMPLEMENTING CONFIGURATION STANDARDS FOR FACILITATING COMPLIANCE TESTING IN AN ENVIRONMENT

(75) Inventors: Naga A. Ayachitula, Elmsford, NY (US); Melissa J. Buco, Amawalk, NY (US); Lalitha Kamesam, Cortlandt Manor, NY (US); David Loewenstern, New York, NY (US); Larisa Shwartz, Scarsdale, NY (US); Christopher Ward, Glen Ridge, NJ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/165,021

(22) Filed: Jun. 30, 2008

(51) Int. Cl.
G06F 15/16 (2006.01)
G06F 15/173 (2006.01)
G06F 15/177 (2006.01)

(52) U.S. Cl. .............. 709/224; 709/220; 709/223; 709/225; 709/229

(58) Field of Classification Search ......... 709/217, 709/220, 223, 224, 225, 229; 707/1; 714/24; 703/6, 21
See application file for complete search history.

(56) References Cited

U.S. PATENT DOCUMENTS

| 7,152,185 | B2 * | 12/2006 | Srivastava et al. ........... 714/24 |
| 7,266,538 | B1 * | 9/2007 | Shatil ........................... 707/1 |
| 2002/0035463 | A1 * | 3/2002 | Lynch et al. .................. 703/21 |
| 2002/0152057 | A1 * | 10/2002 | Wang et al. .................... 703/6 |
| 2006/0149830 | A1 * | 7/2006 | Bellinger et al. ........... 709/217 |
| 2006/0161879 | A1 | 7/2006 | Lubrecht et al. |

* cited by examiner

*Primary Examiner*—Quang N. Nguyen
(74) *Attorney, Agent, or Firm*—Cantor Colburn LLP; Lou Percello

(57) ABSTRACT

A method for facilitating compliance testing in an environment is provided. The method includes defining each component as a set of attribute value pairs represented as a configuration item (CI) and defining relationships among the CIs. Configuration Standards for the CIs are defined to include scope identifying CIs to which the Configuration Standards apply and restrictions defining requirements for compliance. Compliance testing is performed for components against a selected Configuration Standards by determining, depending on the scope and the restrictions of each of the selected Configuration Standards, which of the components within the scope of the selected Configuration Standards fails to meet the restrictions of respective ones of the selected Configuration Standards; and by outputting results as a list, which includes each of the components that failed to meet respective ones of the selected Configuration Standards.

1 Claim, 15 Drawing Sheets

| Configuration Standard | Scope | Restrictions |
|---|---|---|
| All Linux Computer Systems on which DB2 runs should have a minimum 4 GB of memory | ObjectType='Linux Computer System' AND IsTargetOf('DB2 Instance', 'RunsOn') | Memory> = 4 |
| All installations of Software Package X must be at version 6 or higher | ObjectType = 'Software Package' AND Name = 'X' | Version >= 6 |
| All DB2 Servers must have a designated DBA | ObjectType = 'DB2 Instance' | Contact != null |

FIG. 1

| FIG. 1A | FIG. 1B |
|---|---|

Example CIs: Attribute-Value Pairs and Relationships

| Unique ID | C1 |
|---|---|
| Object Type | DB2 Instance |
| DB2 Instance | abc.watson.ibm.com |
| Product Name | IBM Universal Database |
| Product Version | DB2 v9.1.0.0 |
| Home | /home/db2test |
| Server Name | db2test |
| Computer system | abc.watson.ibm.com |
| Port | 50001 |
| Contact | John Mitchell |

104A — Unique ID
102A — Object Type
110

120D

100B

| Unique ID | C2 |
|---|---|
| Object Type | App Server |
| Server Name | xyz.watson.ibm.com:9001 |
| Computer System | xyz.watson.ibm.com |
| IP Address | 9.2.2.2 |
| Listening Port | 9001 |
| Memory Size | 4 GB |

104B — Unique ID
102A — Object Type
112 — IP Address

| Configuration Standard | Scope | Restrictions |
|---|---|---|
| All Linux Computer Systems on which DB2 runs should have a minimum 4 GB of memory | ObjectType='Linux Computer System' AND IsTargetOf('DB2 Instance', 'RunsOn') | Memory>= 4 |
| All installations of Software Package X must be at version 6 or higher | ObjectType = 'Software Package' AND Name = 'X' | Version >= 6 |
| All DB2 Servers must have a designated DBA | ObjectType = 'DB2 Instance' | Contact != null |

Options for Defining
Configuration Standards

| FIG. 4A |
| FIG. 4B |

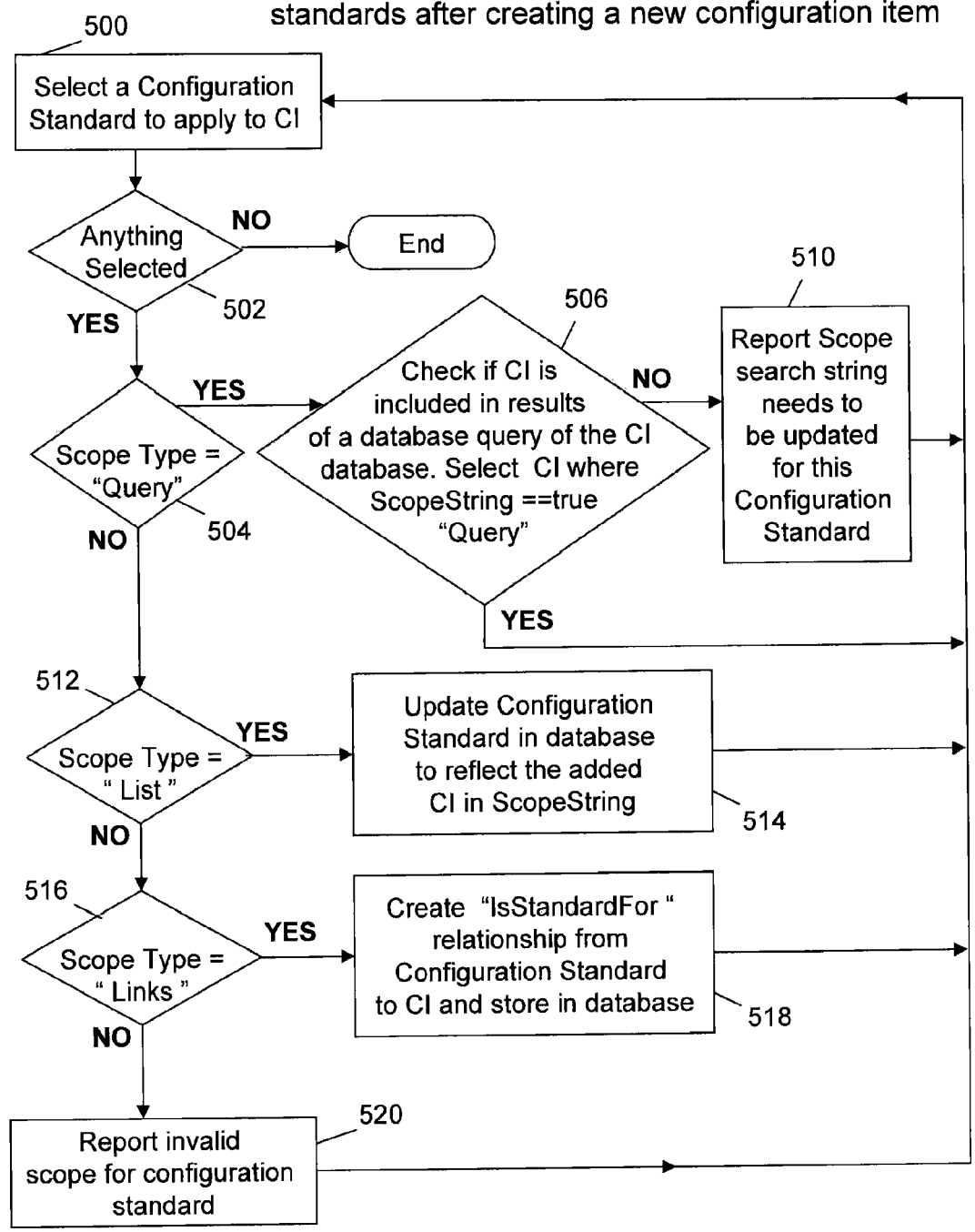
FIG. 5 Process for updating configuration standards after creating a new configuration item

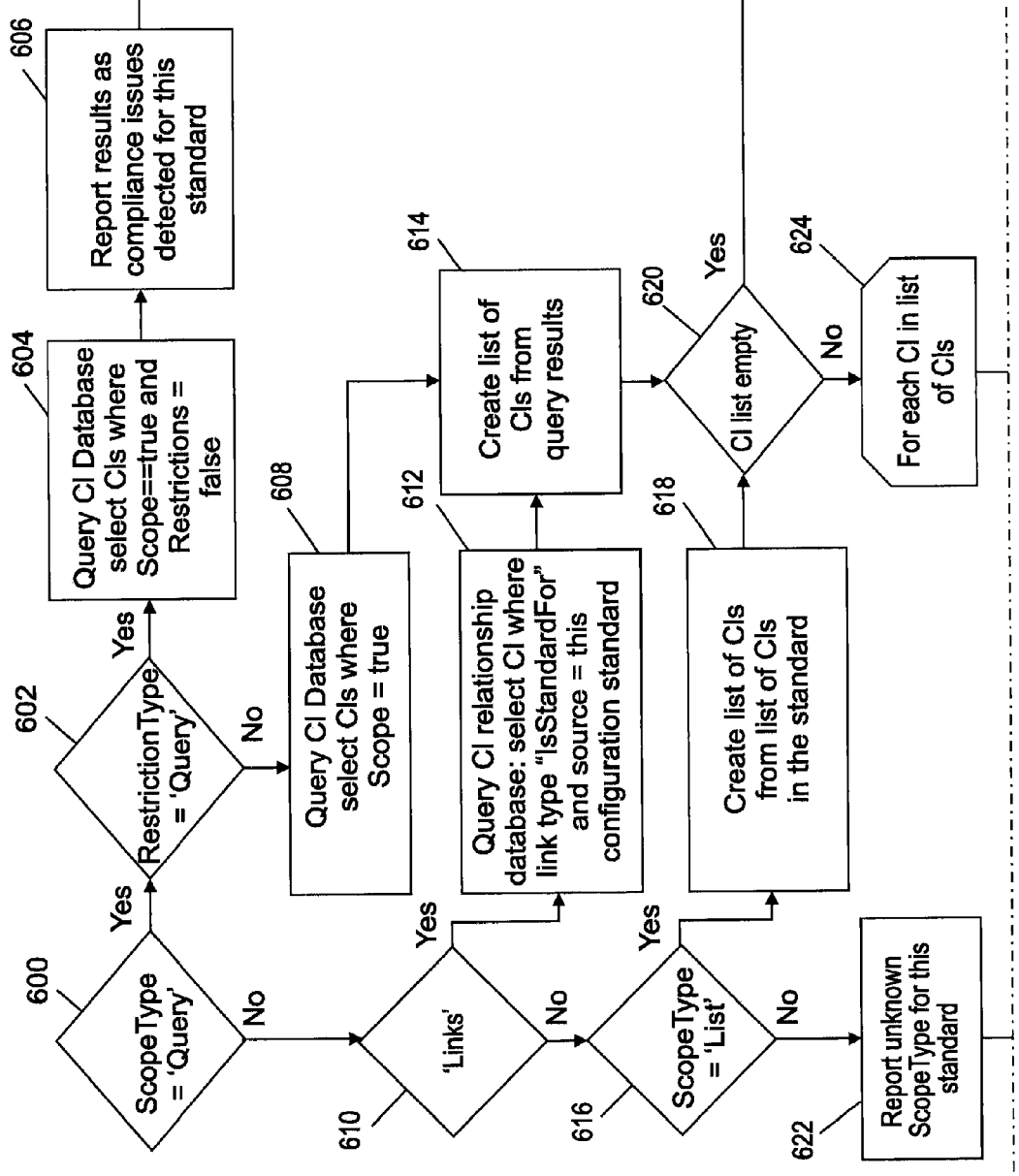

FIG. 7A

| Scope →<br>Restrictions ↓ | Search String<br>most flexible but also most complex to specify and not easy to find all standards for a particular CI | List of CIs<br>defining and maintaining lists is essential but error prone | Explicit Links<br>defining and maintaining links is essential but error prone |
|---|---|---|---|
| Search String<br>most flexible but also most complex to specify | Checking for non-compliance checking amounts to performing a search to find all CI for which scope is true and restrictions is false<br>e.g. when (ObjectType = "LinuxComputerSystem" And Dept="53X") AND ! (Memory >=4) | Checking for non-compliance amounts to checking evaluating if the restrictions are met for each CI Instance in list | Checking for non-compliance amounts to checking evaluating the restrictions are met for each linked CI Instance |

FIG. 7B

| | Search String | List of CIs | Explicit Links |
|---|---|---|---|
| CI Instance need to specify which attributes and relationships to be compared; need specialized method for comparison; multiple values, ranges, and alternative links not supported | Checking for non-compliance amounts searching for CIs to which the standard applies and then using the compare method to compare the CI Instance and to each of the CIs in the search result | Checking for non-compliance amounts to using the compare method to compare the restricted attribute values and links of the CI Instance against those of each CI Instance in the list | Checking for non-compliance amounts to using the compare method to compare the restricted attribute values and links of CI Instance against those of each linked CI Instance |
| CI Standard Instance need complex objects and instances to specify attributes and relationships which are standard as wells as specify multiple values, ranges, and comparison operators need specialized comparison method; | Checking for non-compliance amounts searching for CIs to which the standard applies and then using the standard compare method to compare the CI Standard Instance and to each of the CIs in the search result | Checking for non-compliance amounts to using a standard compare method the restricted attribute values and links of the CI Instance against those of each CI Instance in the list | Checking for non-compliance amounts to using a standard compare method to compare the restricted attribute values and links of CI Standard Instance against those of each linked CI Instance |

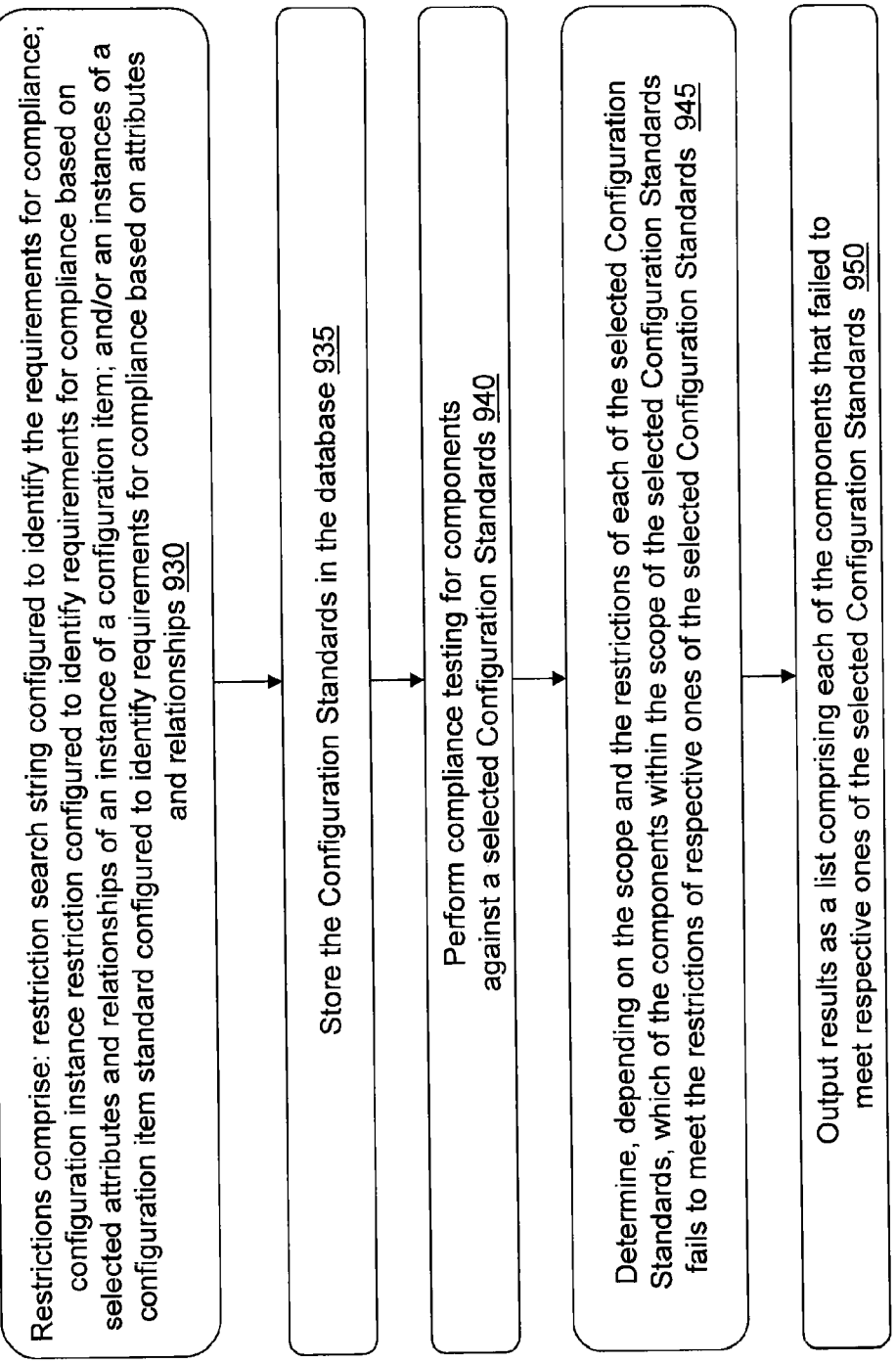

DEFINING AND IMPLEMENTING CONFIGURATION STANDARDS FOR FACILITATING COMPLIANCE TESTING IN AN ENVIRONMENT

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND

1. Field of the Invention

This invention relates to enterprise asset management, and particularly to the definition and use of Configuration Standards for compliance checking in an environment.

2. Description of Background

Configuration and change management are the core control processes within IT Service Management and are responsible for configuration control and the minimization of adverse effects of changes within complex IT environments. One aspect of configuration management is to perform regular audits of the IT environment. Such audits include a check that components of the environment (i.e., configuration items) comply with established standards or policies. Examples of standards or policies include:

All Linux™ computer systems owned by Department 35X on which DB2™ runs should have a minimum 4 GB of memory;

All installations of software package X must be at version 6 or higher;

All DB2™ instances must have a designated DBA.

The output of these regular audits is a report of any compliance violations detected. This report can be used for proactive problem management to identify problems that require remediation. Currently, however, there are no standard methods for defining Configuration Standards that would enable efficient compliance testing.

What would be desirable is to way to define Configuration Standards in a manner such that they can be readily maintained and used for regular compliance checking.

SUMMARY

The shortcomings of the prior art are overcome and additional advantages are provided through the provision of a method for defining Configuration Standards for facilitating compliance testing in an environment. The method includes defining each managed component of an enterprise as a configuration item represented as a set of attribute value pairs and defining various types of relationships between the configuration items. The method also includes defining Configuration Standards for the configuration items, the Configuration Standards including scope and restrictions, the scope identifying configuration items to which the Configuration Standards apply, the restrictions defining requirements for compliance. The method further includes performing compliance testing for components of the enterprise, determining if the components within the scope of each Configuration Standard meet its requirements, and outputting a list of each component and the Configuration Standard for which it fails to comply. The output could optionally include a list of all Configuration Standards checked and as well as all CIs which complied with each Configuration Standard.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, technically we have achieved a solution which defines Configuration Standards in a manner such that they can be readily maintained and used for regular compliance checking. Configuration items represented by a set of attribute value pairs and the relationships between configuration items are defined and used in conjunction with the Configuration Standards on groupings of configuration items to determine compliance. The Configuration Standards provide a means of managing complex infrastructures (and other infrastructures) by promoting consistency and quality.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 2 illustrates a table of sample Configuration Standards composed from scope and restrictions components in an exemplary embodiment;

FIG. 5 is a flow diagram describing a process for updating Configuration Standards after a new Configuration Item has been created for use in compliance testing in an exemplary embodiment;

FIGS. 7A and 7B are a table summarizing the combination of options for specifying the scope and restrictions components of a Configuration Standard in an exemplary embodiment;

FIGS. 9A and 9B are an example of a method for facilitating compliance testing in an environment in accordance with an exemplary embodiment.

DETAILED DESCRIPTION OF EXEMPLARY EMBODIMENTS

An exemplary embodiment of the present invention outlines a standard methodology for defining Configuration Standards which can be used to facilitate compliance testing and to report violations. The methodology is presented for defining Configuration Standards in a manner such that they can be readily maintained and used for regular compliance checking as recommended by IT Service Management industry best practices, such as the IT Infrastructure Library or for regular compliance checking in other industries. The value of Configuration Standards is well recognized as a means of managing complex IT infrastructures by promoting consistency and quality. In order to realize the benefits, a standard method for defining, maintaining, and checking for compliance is required. Such a methodology is described herein along with a number of implementation alternatives.

Figure 1B:
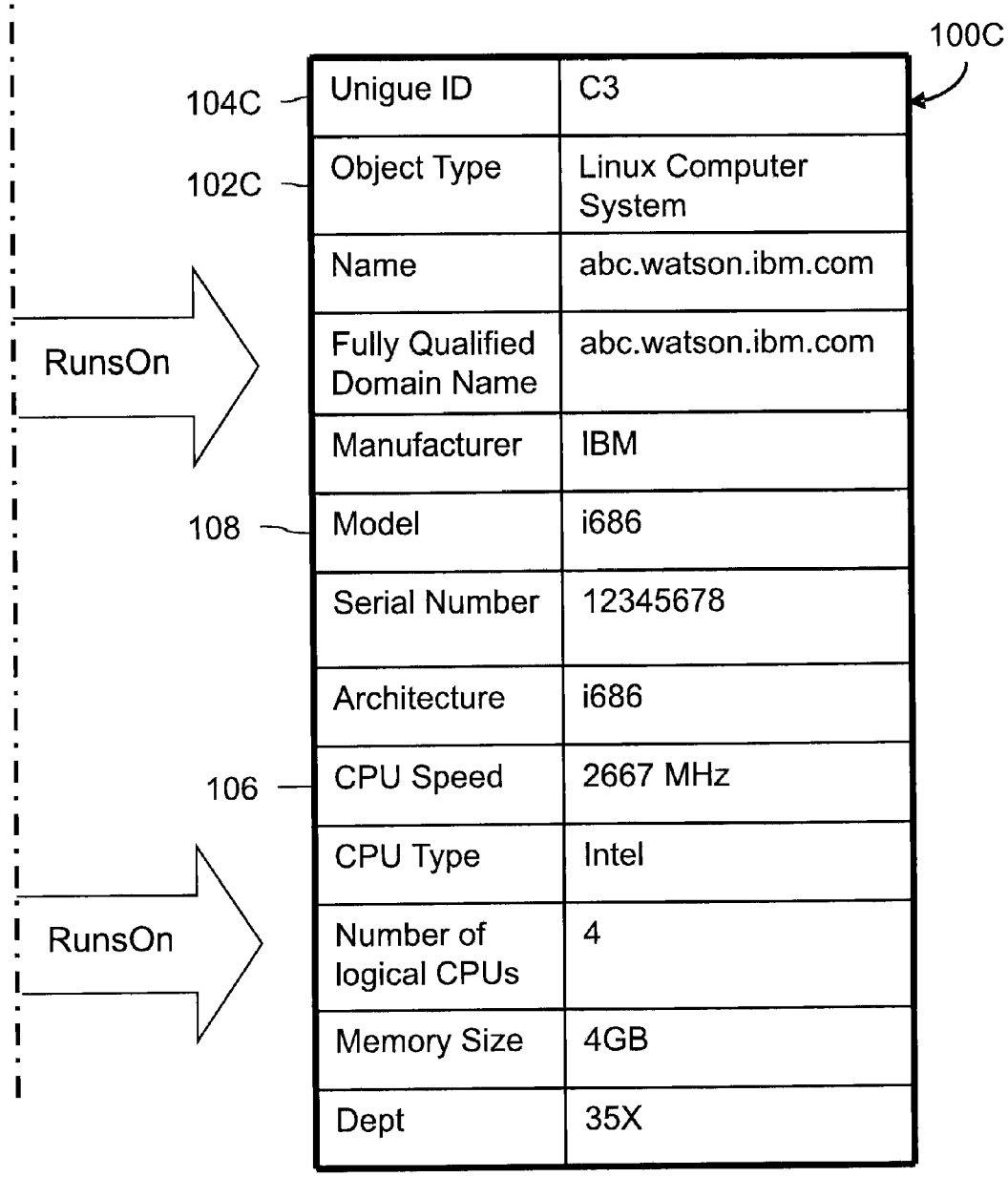
FIG. 1 illustrates sample configuration items, represented by a set of attribute value pairs and relationships between the configuration items.

Turning now to the drawings in greater detail, it will be seen that in FIG. 1 there is diagram depicting tables of managed items in an IT environment, or CIs, and the relationships between CIs. Each CI is represented by a set of attribute value pairs. Each managed item is referred to as a configuration item (CI). Relationships between CIs are named, typed, and directional.

Each managed item of the IT environment, or CI, is defined in terms of a number of attributes, some of which depend on the type of CI. For example, as shown in FIG. 1, a LINUX computer system (represented by table 100C), a DB2 Instance (represented by table 100A), and an App Server (represented by table 100B) each have attributes of ObjectType (fields 102A/102B, 102C) and UniqueID (fields 104A/104B, 104C). However, the computer system might have attributes of CPU speed (field 106) and model (field 108), a DB2 Instance (represented by table 100A) has an attribute of Product Version (field 110), and an App Server Instance (represented by table 100B) has an attribute of IPAddress (field 112).

In addition to CI attributes, CIs have relationships with other CIs. For example, a J2EE component might have a "RunsOn" relationship to a J2EE server. As shown in FIG. 1 for illustrative purposes, the DB2 Instance represented by table 100A has a RunsOn (represented by arrow 120D) relationship with the Linux Computer System (represented by table 100C). In addition, the instance of the App Server represented by table 100B also has a RunsOn relationship (represented by arrow 120E) with the Linux Computer System (represented by table 100C).

A Configuration Standard may be defined as an established policy that applies to a set of CIs. Configuration Standards, in turn, may be defined at any number of levels, such as, department, enterprise, or service provider level. A Configuration Standard may apply to any number of CIs and a CI may be within the scope of any number of Configuration Standards. Conflicts between and among Configuration Standards are not unexpected; however, they are not within the scope of definition and compliance testing based standards.

As described above, standards may be expressed in terms of CI attribute value pairs and the existence of types of relationships between CIs. A Configuration Standard is comprised of two parts: 1) the scope and 2) the restrictions. The scope identifies the set of CIs (i.e., a subset of all CIs) to which the Configuration Standard applies. The restrictions define what is required for compliance with the standard. FIG. 2 illustrates examples of Configuration Standards and how they are composed of a scope and restrictions.

Figure 3A:
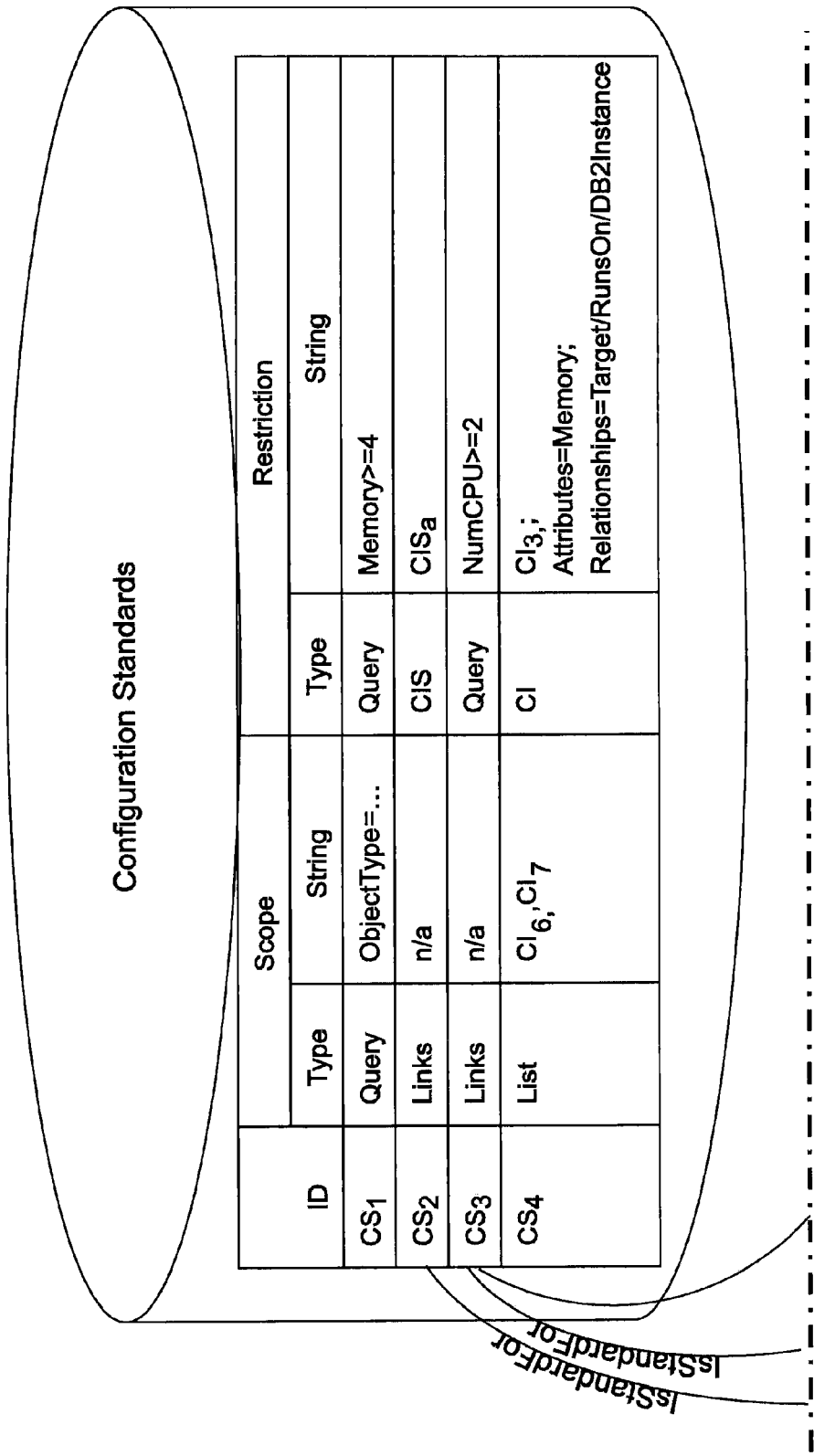
FIG. 3 is a diagram illustrating sample implementations Configuration Standards, Configuration Items, and Configuration Item Standards in an exemplary embodiment.
Figure 3:
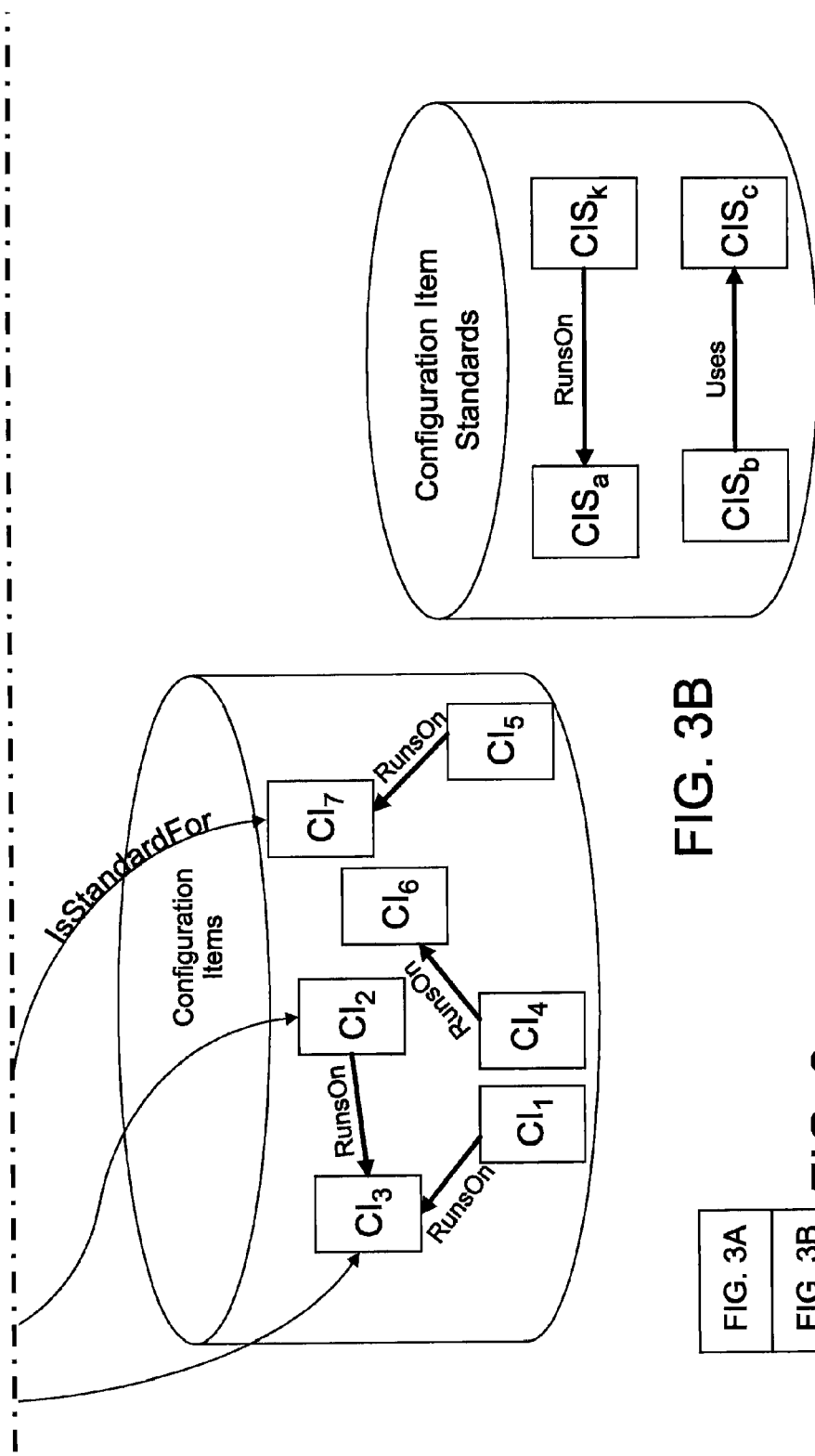

FIG. 3 illustrates sample implementations of Configuration Standards.

In accordance with an exemplary embodiment, the scope of a Configuration Standard may be implemented as:

A search string (e.g., ObjectType="Linux Computer System" AND Dept="35X");

A list of CIs (e.g., $C_6$, $C_7$); and

A set of links from the Configuration Standard to the CIs to which it applies.

Each implementation has advantages and disadvantages. There is no reason that a combination of implementations cannot be used. With a search string implementation, the scope of the standard is dynamically computed when the standard is to be applied. As a result there is no easy way to answer the question of which standards apply to a particular CI without computing the scope for each standard. Such a query is more readily answered when a list of CIs or a set of links to CIs is used. However, these methods require that the list entries or links be updated for each applicable Configuration Standard each time a new CI is created. Which implementation of scope is best depends on the environment and the requirements of the particular Configuration Standard. One might also consider using a hybrid approach, namely, using a search string application to periodically compute the scope and then storing the list of CIs or links in order to improve query capability (i.e., determine which standards apply to which CIs).

In accordance with an exemplary embodiment, the restrictions of a Configuration Standard may be implemented as:

A search string (e.g., Memory=5);

A pointer to an existing CI instance (e.g., $CI_3$) and a list of which attributes (e.g., Memory) of that instance should be considered standard and of which relationships should be considered standard. The specification for the standard relationships could be quite complex. This is particularly true if it is necessary to specify multiple attribute value pairs for the related CI or specify additional relationships for the related CI. For such complex standards, the other options for specifying the restrictions component of the Configuration Stand might be better suited. One example of a reasonable specification of relationships for the restrictions component would be limit it to direct relationships and a single attribute value pair (e.g. ObjectType) in the related CI. For example, the RestrictionString="$CI_3$;Attributes=Memory; Relationship=Target/RunsOn/DB2 Instance" might be used to indicate that all CIs within the scope of this Configuration Standard should have the same value for Memory as does $CI_3$ and be the target of a RunsOn relationship which has a source CI with ObjectType="DB2 Instance".

A pointer to an instance of CI Standard Object (e.g., $CIS_a$) with only those attribute value(s) pairs and relationships which are considered standard can be defined. This implementation would allow for the specification of standard with multiple levels of CI relationships. That is, the restrict could specify a CI related to CI related to another CI, etc. and the specification of multiple attribute value(s) pairs within each of those CIs.

The search string implementation is the most flexible because it allows for specifying ranges of values (e.g. 4<Memory<6) but it the most difficult to specify. Using an existing CI instance as a model for a standard is very straightforward. However, it does not support the use of multiple values or ranges of values for attributes or the existence of one or another attribute and it requires the specification of which attributes and relationships are included in the standard. Additionally, it would be difficult to specify more than just whether the CI is the target/source of particular types of links with CIs of a particular ObjectType. For example, putting restrictions of the values of attributes of a linked CI or on links to a linked CI would be difficult to specify. In order to satisfy such requirements, the use of a CI Standard object is better suited. This option would require a new object (a CIS) and instances which would support a subset of the functionality (e.g., multiple values, comparison specification) which the search string option provides.

Figure 4A:
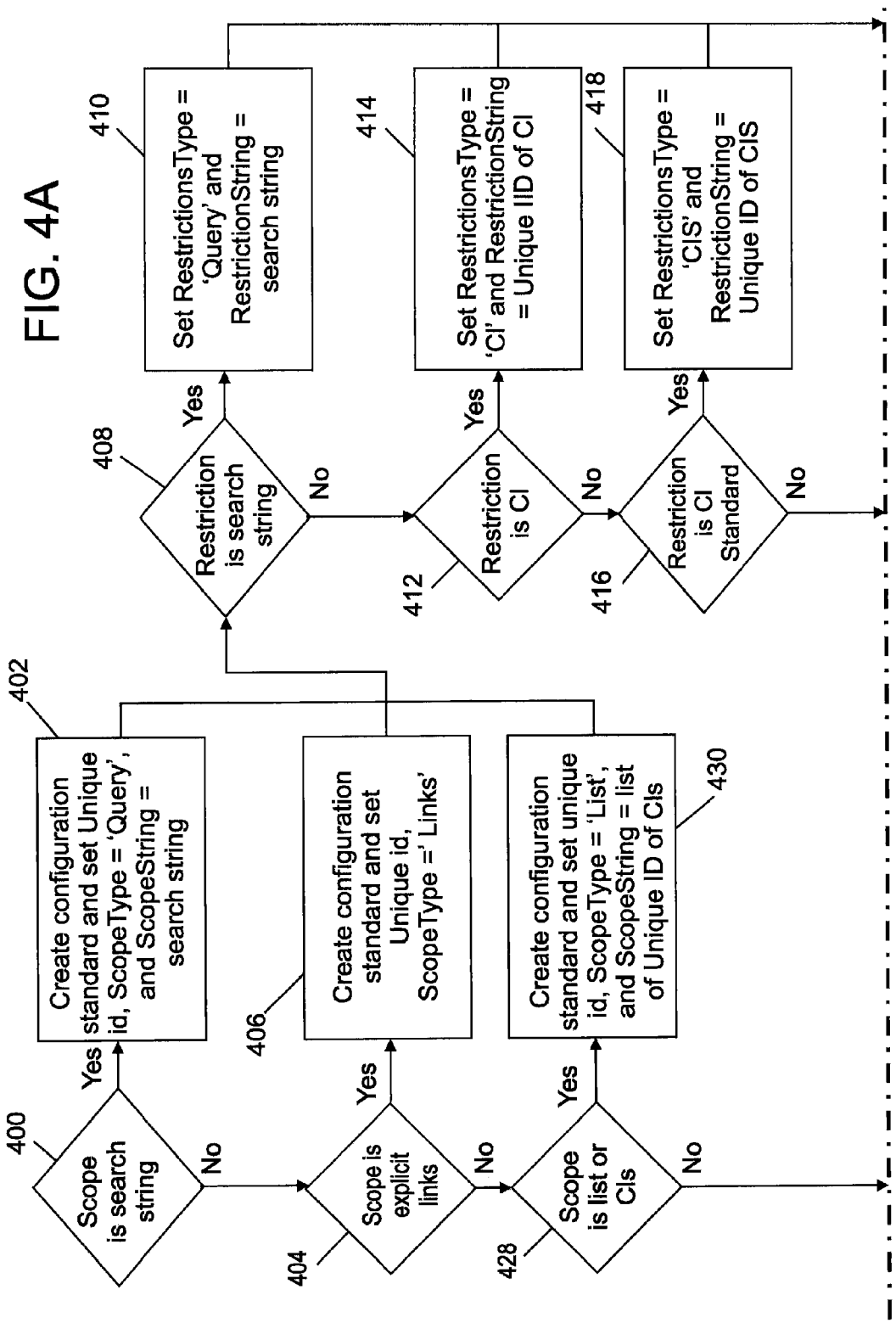
FIG. 4 is a flow diagram describing a process for defining and implementing Configuration Standards for use in compliance testing in an exemplary embodiment.
Figures 4, 4B:
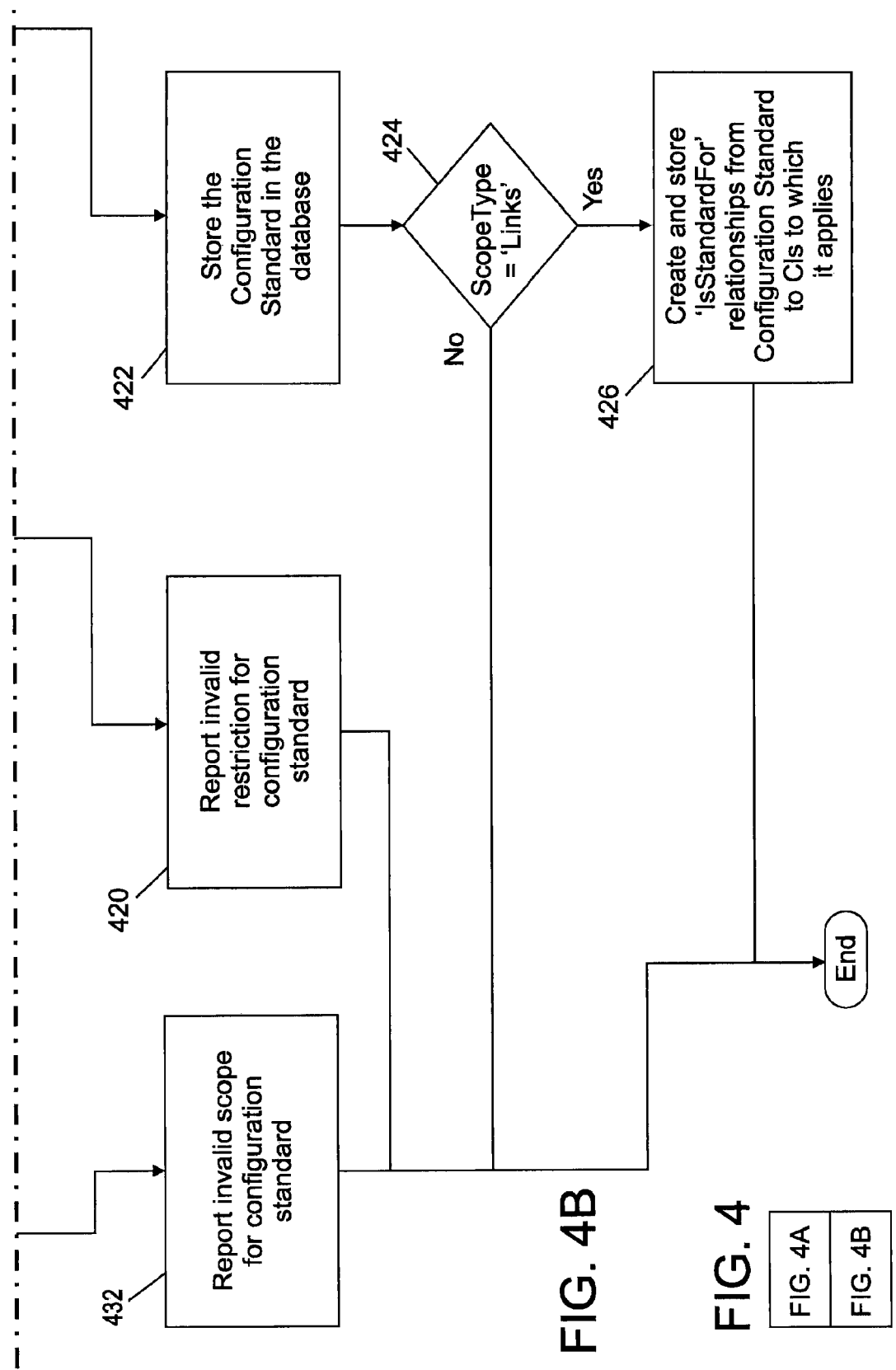

Turning now to FIG. 4, a flow diagram describing a process for defining a Configuration Standard for use in compliance testing will now be described in an exemplary embodiment. Steps 400, 404, and 424 branch depending on the ScopeType scope, which is to be used to define the Configuration Standard, to Steps 402, 406, and 426 respectively to perform the initial definition of Configuration Standard and set its ScopeType for each of the different possible options. Steps 408, 412, and 416 branch (depending on the type of restrictions to be used for the Configuration Standard) to steps 410, 414, and 416 respectively to set the RestrictionsString of the Configuration Standard for each of the different options. At step 422, the Configuration Standard is stored in a database (see, e.g., a database 806 shown in FIG. 8). Step 424 checks if the ScopeType of the Configuration Standard='Links' and if creates "IsStandardFor" relationships between the Configuration Standard and any CIs indicated by the user. These relationships are also stored in a database (see, e.g., a database 806 shown in FIG. 8).

FIG. 5, which is a flow diagram describing a process for updating Configuration Standards for use in compliance testing, will now be described in an exemplary embodiment. This process should be invoked for any new CI which is created.

At step 500, a subject matter expert is asked to select a Configuration Standard to which the CI should conform. A check is made at step 502 whether anything is selected. If nothing is selected, the process ends. Otherwise, steps 504, 512, and 516 branch depending on the ScopeType of the Configuration Standard to steps 506, 514, and 518 respectively.

If the ScopeType of the Configuration Standard is "Query" at step 504, then branch to step 506. If not, branch to step 512. At step 506, a check is made as to whether the CI is included in the scope of the Configuration Standard by executing a query (Select CI from CI_Database where ScopeString=true). If the CI is included in the result of the query, then no further action is required and the process returns to step 500. Otherwise, at step 510, the process informs the subject matter expert that the ScopeString of the Configuration Standard must be updated in order for the CI to be included in the scope. Then the process returns to step 500.

If the ScopeType of the Configuration Standard is "List" at step 512, then branch to step 514. If not, branch to step 516. At step 514, the CI Unique ID is added to the ScopeString of the Configuration Standard in the database. Then the process returns to step 500.

If the ScopeType of the Configuration Standard is "Links" at step 516, then branch to step 518. If not, branch to step 520 and report invalid scope for Configuration Standard. At step 518, a "IsStandardFor" relationship is created with a source of the Configuration Standard and a target of the CI and stored in the database. Then the process returns to step 500.

Figure 6B:
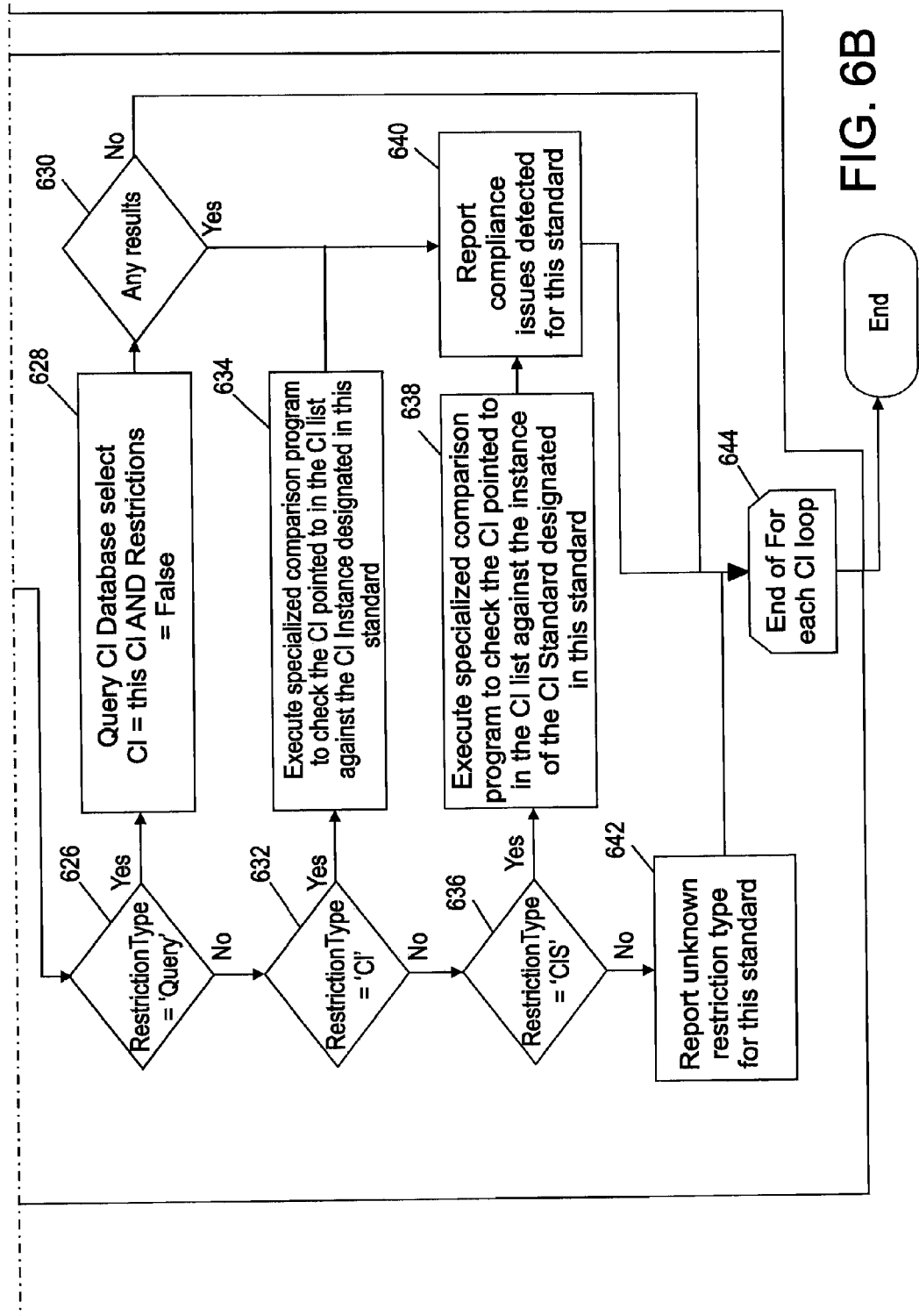
FIG. 6 is a flow diagram describing a process for compliance testing in an exemplary embodiment.

Turning now to FIG. 6, a flow diagram describing a process for performing compliance testing for a particular Configuration Standard will now be described in an exemplary embodiment. Steps 600, 610, and 616 branch depending on the ScopeType of the Configuration Standard to steps 602, 612, and 618 respectively.

For the case where the ScopeType is "Query" at step 600, step 602 is executed to check whether the RestrictionsType="Query". If so, step 604 is executed to query the database ("Select CI from CI_Database where ScopeString=true and RestrictionsString=false"). The results of the query, if any, are reported as violations in step 606 and the process ends. If the RestrictionsType is not a "Query", step 608 is executed to query the database ("Select CI from CI_Database where ScopeString=true"). Then, step 614 is performed to create a list of CIs from the query results. If the list is empty at step 620, there is no further action and the process ends. Otherwise, the process is instructed to check the restrictions against every CI in the list at step 624.

For the case where the ScopeType is "Links" at step 610, step 612 is executed to query the database to find those CIs which are the target of an "IsStandardFor" relationship with a source of this Configuration Standard. Then, step 614 is performed to create a list of CIs from the query results. If the list is empty at step 620, there is no further action and the process ends. Otherwise, the process is instructed to check the restrictions against every CI in the list at step 624.

For the case where the ScopeType is "List" at step 616, step 618 is executed to create a list of CIs from the ScopeString. If the list is empty at step 620, there is no further action and the process ends. Otherwise, the process is instructed to check the restrictions against every CI in the list at step 624.

Each of the CIs is examined in the loop beginning at step 624 and ending at step 644. Within the loop, steps 626, 632, 636 branch to handle each RestrictionsType in steps 628, 634, and 638 respectively. At step 628, the check of the CI against the restrictions is handled by executing a query of the CI database (Select CI where the CI=this CI and Restrictions=false). If there are any results of the query at 630, they are reported in step 640 as a violation. At step 634, the check of the CI against the restrictions is handled by an application which compares the Attributes specified in the RestrictionsString for the CI in question against those of the standard CI specified in the RestrictionsString. Any variances are reported in step 640 as a violation. In addition, the applications checks that any Relationships specified in the RestrictionsString which exist in the standard CI are also present in the CI in question. If not, this is reported as a violation at 640. At step 638, the check of the CI against the restrictions is handled by an application which compares the Attributes in the CI in questions against those specified in the Configuration Item Standard (CIS) instance indicated in the RestrictionsString. Any variances are reported in step 640 as a violation. In addition, the application checks that any Relationships which are present for the CIS instance are also present for the CI in question. If not, this is reported as a violation. The application will recursively check the attributes and relationships of the related CIS instance against those of the related CI instance in question at 633. Any violations are reported in Step 640. Also, any unknown restriction type for this standard is reported at 642.

In another example, a Configuration Standard may be implemented using scope as a list, and restrictions as a CI instance. Assume the ScopeString="$CI_6$, $CI_7$" and RestrictionString is "$CI_4$;Attributes='Memory'; Relationships='Target/RunsOn/DB2Instance'. The process then compares the designated attribute values (Memory) and relationships (RunsOn) of each CI instance listed in the scope ($CI_6$, $CI_7$) against those of the CI designated as the standard instance ($CI_4$,) in the restrictions. In this example, a check is made that $CI_6$, and $CI_7$) each have Memory=Memory of $CI_4$ and that each is the target of a "RunsOn" relationships with a source CI with ObjectType="DB2Instance".

In yet a further example, a Configuration Standard may be implemented with ScopeType="Links", RestrictionType="CIS", RestrictionString="$CIS_a$,". For example, the scope may be those CIs which are the target of "IsStandardFor" links with a source of Configuration Standard $CS_3$. Suppose that $CIS_a$ defines Memory with a range of 4 to 6 and is the target of a 'RunsOn' relationship to $CIS_k$ which has ObjectType='DB2 instance.' For each CI instance in the scope of Configuration Standard $CS_3$, a comparison application compares the attribute value pairs of the CI to those the attribute value(s)/ranges pairs defined in the Configuration Item Standard $CIS_a$ as well as check for the existence of a "RunsOn" relationship with target of the CI and a source of a CI with attribute value pairs consistent with those specified in Configuration Item Standard $CIS_k$. Note that the relationship between a Configuration Standard and a CI is typed ("IsStandardFor") and directional, as are all relations between CIs because this enables the Configuration Standard itself to be a CI (i.e. a managed element of the IT environment). Note also that a Configuration Item Standards could also be a CI.

The choice of implementations for Configuration Standards may be based upon the needs of the organization. The choice will impact the method and ease of performing compliance testing as well as the facility with which the applicability of Configuration Standards to CI can be queried. The advantages and disadvantages of the various implementation choices and their impact on compliance testing are summarized in FIGS. 7A and 7B. There is no reason that an organization cannot mix and match and/or use a combination of implementations. The choice of implementation(s) should be based on organization requirements.

Figure 8:
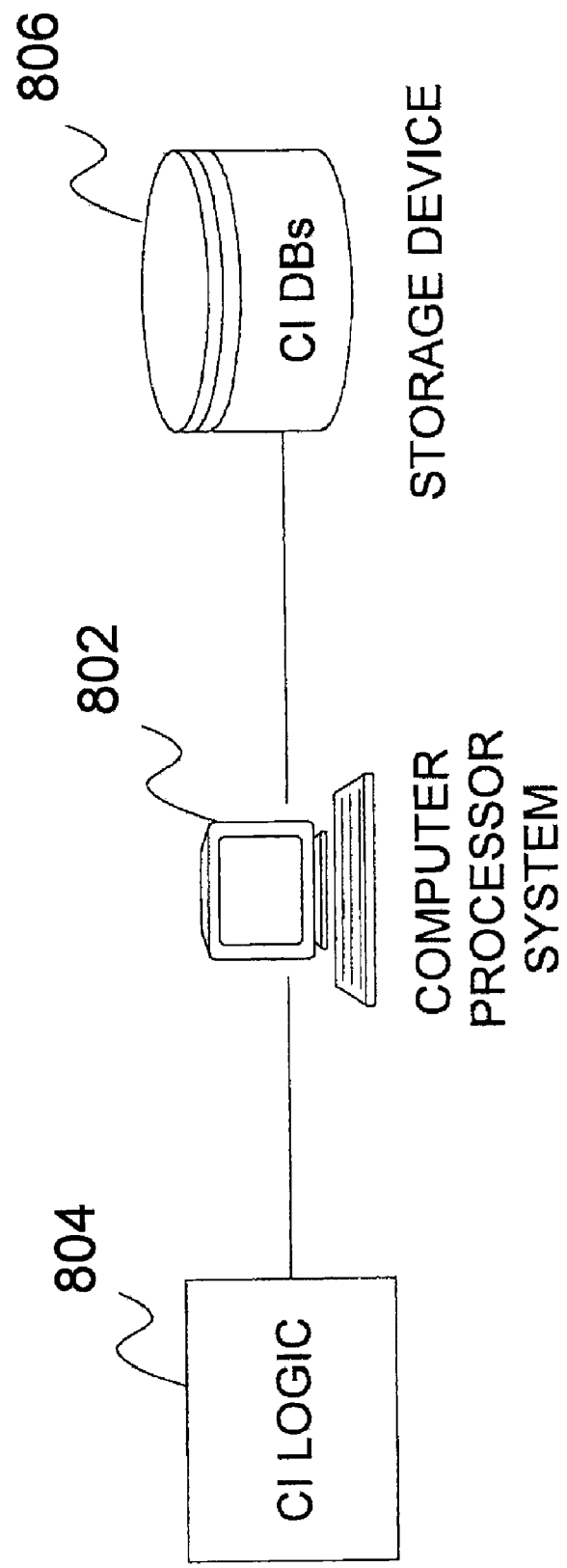
FIG. 8 illustrates a system for a Configuration Standard implementation in an exemplary embodiment.

FIG. 8 illustrates a Configuration Standard implementation in accordance with an exemplary embodiment. For example, an exemplary process may be implemented via a system such as that depicted in FIG. 8, which includes a computer processor device 802 having CI logic 804 executing thereon. The CI logic 504 may be an application that is used to enter/define configuration items including attributes and values for each configuration item in an IT environment. The CI logic 804 may also be used to run queries for compliance testing as described above. The computer processor device 802 is in communication with a storage device (database) 806, which may comprise memory within the computer processor device 802 or may be a separate component that is logically addressable by the computer processor device 802. The storage device 806 stores one or more databases as discussed herein.

Although examples have been provided relating to an IT environment, it is understood that exemplary embodiments can apply for testing components, devices, machinery, systems, etc. in any environment. An IT environment is only provided for illustrative purposes.

Figure 9A:
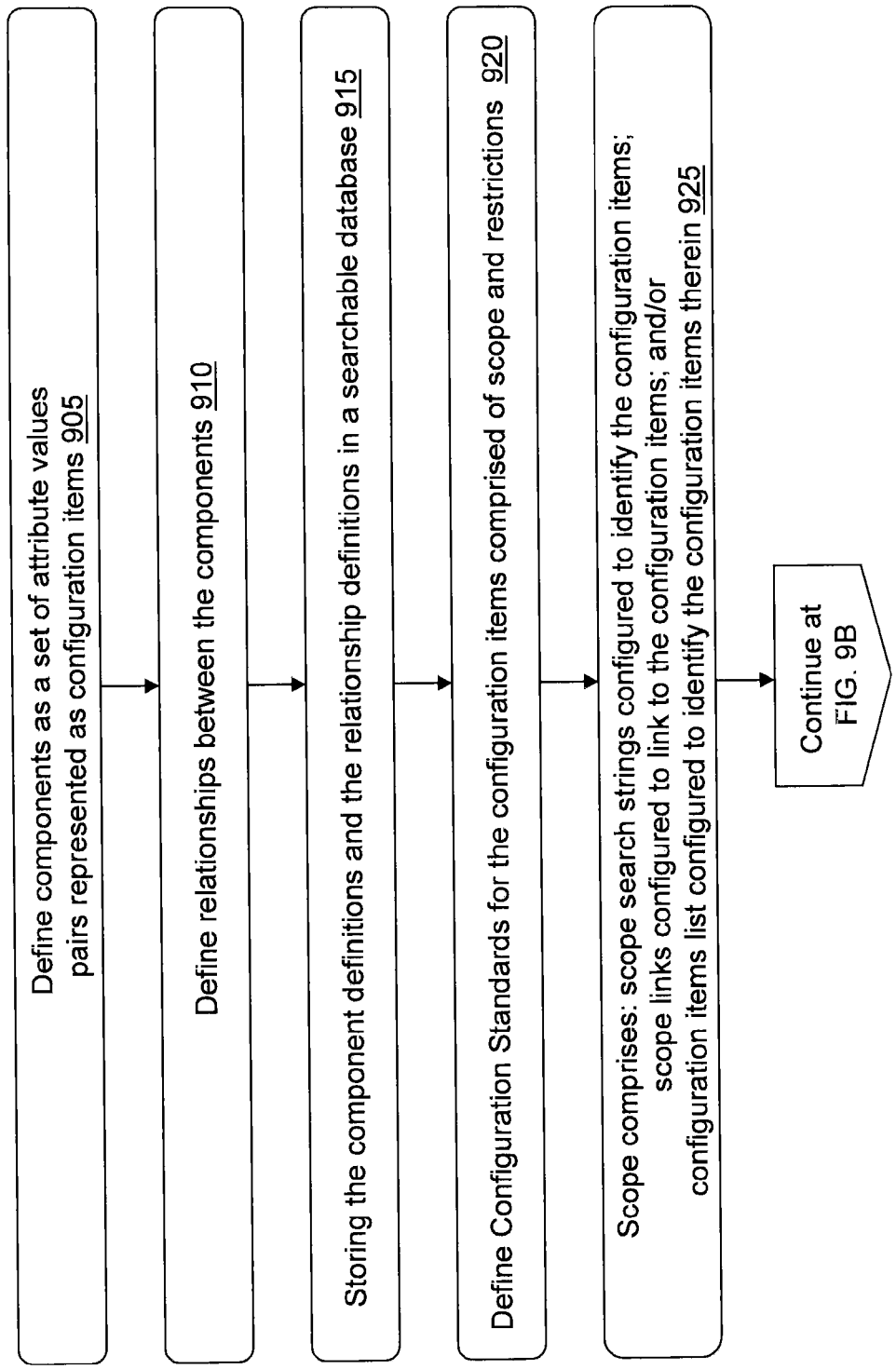

FIGS. 9A and 9B are an example of a method for facilitating compliance testing of components in an environment in accordance with an exemplary embodiment.

Components of an enterprise are defined as a set of attribute value pairs represented as configuration items at 905. Relationships between the components are defined at 910.

The component definitions and the relationship definitions are stored in a searchable database at 915.

Configuration Standards for the configuration items are defined, where the Configuration Standards are comprised of scope and restrictions, in which the scope identifies configuration items to which the Configuration Standards apply and the restrictions define requirements for compliance to the Configuration Standards at 920.

The scope, for the Configuration Standards, comprises at least one of scope search strings, which are configured to identify the configuration items via a scope search string search; scope links, which are configured to identify and link to the configuration items; and/or configuration items list, which is configured to identify the configuration items therein at 925.

The restrictions, for the Configuration Standards, comprise at least one of a restriction search string which is configured to identify the requirements for compliance via a restriction search string search, configuration instance restriction which is configured to identify requirements for compliance based on attributes of a (particular existing) configuration instance, and/or configuration items standard instance which is configured to identify requirements for compliance based on attributes of a created object at 930. For example, a configuration instance restriction may be based on an existing configuration instance, so that compliance of the configuration items can be determined based on whether the configuration items meet the attributes of the existing configuration instance. The existing configuration instance has attributes that can be compared or contrasted to, and the configuration items may be required to be greater than, equal to, or less than certain attributes of the configuration instance. Also, for example, the created object may be similar to a virtual machine that has attributes that can be compared or contrasted to, and the configuration item may be required to be greater than, equal to, or less than certain attributes of the created object. The created object is created so that any configuration items that are within the scope can be measured against the created object to determine compliance. Further, for example, a restriction search string can allow a restriction search string search to be performed to locate the relevant restriction requirements for compliance, and the configuration items can be compared or contrasted to the relevant restriction requirements to determine compliance. It is understood that various thresholds may be set to determine whether configuration items meet the restriction requirements.

The Configuration Standards are stored in the database at 935.

Compliance testing is performed for components against a selected Configuration Standards at 940. The performance compliance comprises determining, depending on the scope and the restrictions of each of the selected Configuration Standards, which of the components within the scope of the selected Configuration Standards fails to meet the restrictions of respective ones of the selected Configuration Standards at 945. The performance compliance comprises outputting results as a list, wherein the list comprises each of the components that failed to meet respective ones of the selected Configuration Standards at 950.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While exemplary embodiments to the invention have been described, it will be understood that those skilled in the art, both now and in the future, may make various improvements and enhancements which fall within the scope of the claims which follow. These claims should be construed to maintain the proper protection for the invention first described.

What is claimed is:

1. A method for facilitating compliance testing in an environment, comprising:
    defining components for compliance testing as a set of attribute values pairs represented as configuration items;
    defining relationships between the components;
    storing the component definitions and the relationship definitions in a searchable database;
    defining Configuration Standards for the configuration items, the Configuration Standards comprised of scope and restrictions, the scope identifying configuration items to which the Configuration Standards apply, the restrictions defining requirements for compliance to the Configuration Standards;
    wherein the scope, for the Configuration Standards, comprises:
        scope search strings, which are configured to identify the configuration items via a scope search string search;
        scope links, which are configured to link to the configuration items for identifying the configuration items; and
        configuration items list, which is configured to identify the configuration items therein;
    wherein the restrictions, for the Configuration Standards, comprise:
        a restriction search string, which is configured to identify the requirements in terms of attributes and relationships for compliance via a restriction search string search;
        configuration instance restriction, which is configured to identify requirements for compliance based on attributes and relationships of a configuration instance; and
        configuration items standard instance, which is configured to identify requirements for compliance based on attributes and relationships of a created object;
    storing the Configuration Standards in the database; and
    performing compliance testing for components against a selected Configuration Standards, the performance compliance comprising:
        determining, depending on the scope and the restrictions of each of the selected Configuration Standards, which of the components within the scope of the selected Configuration Standards fails to meet the restrictions of the selected Configuration Standards; and
        outputting results as a list, wherein the list comprises each of the components that failed to meet the selected Configuration Standards.

* * * * *